United States Patent [19]
Bell et al.

[11] Patent Number: 5,937,038
[45] Date of Patent: Aug. 10, 1999

[54] APPARATUS FOR TELEVISION DISPLAY OF TELEPHONE AUDIO AND DATA DIALOG

[75] Inventors: Michael D. Bell; Robert M. Beaumont; Allan B. Cameron; Trenton A. Pomeroy; Gerry Verner, all of Saint John; Ken A. Mayhew, Saskatoon; Glen P. Gnazdowsky, Saskatoon; Barb A. Roesch, Saskatoon; Dana Allan, Saskatoon, all of Canada

[73] Assignee: The New Brunswick Telephone Company, Limited, New Brunswick, Canada

[21] Appl. No.: 08/633,819

[22] PCT Filed: Oct. 17, 1994

[86] PCT No.: PCT/CA94/00559

§ 371 Date: Jul. 1, 1996

§ 102(e) Date: Jul. 1, 1996

[87] PCT Pub. No.: WO95/11563

PCT Pub. Date: Apr. 27, 1995

[30] Foreign Application Priority Data

Oct. 22, 1993 [CA] Canada .................................. 2109011

[51] Int. Cl.⁶ .................................................. H04M 11/00
[52] U.S. Cl. .................................... 379/93.17; 379/93.23; 379/110.01; 455/6.3
[58] Field of Search .............................. 379/93.23, 93.24, 379/93.25, 93.17, 102.03, 102.02, 102.01, 90.01, 93.01, 93.07, 93.05; 348/13, 6, 7, 12; 455/6.3, 5.1, 3.1

[56] References Cited

U.S. PATENT DOCUMENTS

| | | | |
|---|---|---|---|
| 4,456,925 | 6/1984 | Skerlos et al. | 358/85 |
| 5,327,554 | 7/1994 | Palazzi, III et al. | 379/93.25 |
| 5,349,638 | 9/1994 | Pitroda et al. | 379/93.23 |
| 5,404,393 | 4/1995 | Remillard | 379/93.25 |
| 5,410,326 | 4/1995 | Goldstein | 379/102.07 |
| 5,570,415 | 10/1996 | Stretton et al. | 379/102.07 |
| 5,631,745 | 5/1997 | Wong et al. | 379/102.03 |

FOREIGN PATENT DOCUMENTS

| | | | |
|---|---|---|---|
| WOA90 10988 | 9/1990 | WIPO | H04M 11/00 |
| WOA92 09955 | 6/1992 | WIPO | G06F 13/10 |

*Primary Examiner*—Stella Woo
*Attorney, Agent, or Firm*—Hayes, Soloway, Hennessey, Grossman & Hage, PC

[57] ABSTRACT

This invention relates apparatus for interconnection with the telephone network to manipulate and direct audio and data dialog relating to subscriber-directed audio, interactive voice response and data dialogue over the telephone network using a television set connected to the apparatus disclosed herein. The dialogue is controlled by the subscriber using a hand-held remote control which directs the subscriber dialogue over the telephone network to data bases and other services accessed by the subscriber to provide information to the subscriber via a television set and to allow the subscriber to initiate transactions with the data bases and other services to permit the delivery of information to the subscriber and to enable the subscriber to place orders, do home banking, home shopping and a host of other activities.

8 Claims, 11 Drawing Sheets

APPARATUS FOR TELEVISION DISPLAY OF TELEPHONE AUDIO AND DATA DIALOG

BACKGROUND OF THE INVENTION

This invention relates to apparatus for the display, manipulation and control of dialogue between a public switched telephone network and a subscriber using a television set located at the subscriber's premises and for providing visual and audio output of data and voice band audio information received over the telephone on the television using the apparatus of the present invention.

SUMMARY OF THE INVENTION

The general object of this invention is to provide a low cost, high quality, network of audio, visual and data services and data bases to a subscriber. The invention described herein provides one form of the hardware and software to practice the Display Based Marketing Message Control System and Method taught by R. Beaumont et al in U.S. patent application Ser. No. 08/076,648 filed Jun. 14, 1993.

It is an object of the present invention to provide apparatus that will support television based interactive data communications and telephony to emulate the functions of screen based telephones. The apparatus described herein will implement and support the Bellcore protocols for Voice Band Data transmission (TR-NWT-000030, Voice band Data Transmission Interface Generic Requirements, Issue 2, Bellcore, October 1992.), Calling Number Delivery (TR-TSY-000031, CLASS Feature: Calling Number Delivery, Issue 1, Bellcore, January 1990), Calling Name Delivery (TR-TSY-001188, CLASS Feature: Calling Name Delivery Generic requirements, Issue 1, Bellcore, December 1991.), Calling Identity Delivery on Call Waiting (TR-NWT-000575, CLASS Feature: Calling Identity Delivery on Call Waiting, Issue 1, Bellcore, October 1992), Call Waiting Deluxe (TA-NWT-000416, Call Waiting Deluxe Feature, Issue 2, Bellcore, April 1993.), and the Bellcore Analog Display Service Interface (SR-INS-002461, Customer Premises Equipment Compatibility Considerations for the Analog Display Service Interface, Issue 1, Bellcore, December 1992). The apparatus provides for TV screen based telephone inputs such as number key pads and characters, cursor control of the message area and soft keys and outputs such as a message waiting indicator and other audio and visual information.

It is a object of the present invention to provide a set top unit that uses the telephone and a television set to provide the ability to:

1. Support Device based telephony features such as:
   Visual dial tone
     providing access to the telephone network
   Telephone directory
     provide a user defined name and number telephone directory
   Call logging
     provide user access to a list of the most recent telephone calls
2. Support telephony features such as:
   Calling number delivery
     display the telephone number of the person calling on the television screen
   Calling name delivery
     display the name of the person calling on the television screen
   Message waiting indication
     indicate to the customer that a message is waiting to be heard
   Calling line identification on call waiting with disposition
     display the telephone number and name of the person calling while the customer is on the line and give the customer optional ways to respond to the incoming call.
3. Support Data base and data services features such as:
   Visual enhancements to interactive voice response interactions
   Visual enhancements to voice mail applications
   Visual enhancements to electronic mail applications
   audio and text information combinations to improve understandability
   audio and text combinations for interactive banking
   providing interactive text and audio response for in home shopping services.

In one of its aspects the invention provides apparatus for the provision of analog display services interface messages at a subscriber premises comprising a hand held remote control device containing a plurality of buttons which produce control signaling unique to each button when depressed; and a set top unit having: a telephone termination for connection to a telephone line of the public switched telephone network; a modem connected to the telephone termination responsive to supervisory signaling carried on said telephone line including means connect to and disconnect from said telephone line having means for sending and receiving data thereover and means to provide dial signaling on said telephone line; a TV outlet for connection to a television set; a tuner for providing radio frequency signaling to said TV outlet; a display memory storage area to hold character and graphical symbols connected to said tuner whereby data contained in the display memory area will be modulated onto the radio frequency signaling produced by said tuner to permit the display memory storage area contents to be viewed on said television set; receiver apparatus to receive the control signaling produced by said hand held remote control device; a microprocessor and associated memory for storage of a control program and data; said microprocessor connected to said receiver apparatus to process the control signaling received from the hand held remote control device and connected to said display memory storage area whereby the data and symbols of the display memory area may be modified and updated by the microprocessor to affect the information display appearing on said television set and connected to said modem whereby data and supervisory signaling may be initiated by said microprocessor for delivery to the public switched telephone network and data and supervisory signaling may be received and acted on by said microprocessor.

In another of its aspects the invention provides apparatus for the provision of analog display services interface messages at a subscriber premises comprising: a hand held remote control device containing a plurality of buttons which produce control signaling unique to each button when depressed; and a set top unit having: a telephone termination for connection to a telephone line of the public switched telephone network; a modem connected to the telephone termination responsive to supervisory signaling carried on said telephone line including means connect to and disconnect from said telephone line having means for sending and receiving data thereover and means to provide dial signaling on said telephone line; a TV outlet for connection to a television set; a tuner for providing radio frequency signaling to said TV outlet; a display memory storage area to hold character and graphical symbols connected to said tuner whereby data contained in the display memory area will be modulated onto the radio frequency signaling produced by said tuner to permit the display memory storage area contents to be viewed on said television set receiver apparatus to receive the control signaling produced by said hand held remote control device; a microprocessor and associated memory for storage of a control program and data said microprocessor connected to said receiver apparatus to process the control signaling received from the hand held remote control device and connected to said display memory storage area whereby the data and symbols of the display memory area may be modified and updated by the microprocessor to affect the information display appearing on said television set and connected to said modem whereby data and supervisory signaling may be initiated by said microprocessor for delivery to the public switched telephone network and data and supervisory signaling may be received and acted on by said microprocessor; said modem apparatus further including an audio signaling output for carrying voice band audio signaling delivered to the subscriber over the public switched telephone network; volume control means responsive to control signaling received from said microprocessor having an input port connected to said audio signaling output of said modem and a audio output port connected to said tuner whereby the audio signaling level of said output port is varied upward and downward by the microprocessor in response to commands received by the receiver apparatus in response to control signaling produced by said hand held remote control device to increase or decrease the sound level of the audio output from said television set.

And in yet another of its aspects the invention provides: Apparatus for the provision of analog display services interface messages at a subscriber premises comprising: a hand held remote control device containing a plurality of buttons which produce control signaling unique to each button when depressed; and a set top unit having: a telephone termination for connection to a telephone line of the public switched telephone network; a modem connected to the telephone termination responsive to supervisory signaling carried on said telephone line including means connect to and disconnect from said telephone line having means for sending and receiving data thereover and means to provide dial signaling on said telephone line; a TV outlet for connection to a television set; a tuner for providing radio frequency signaling to said TV outlet; a display memory storage area to hold character and graphical symbols connected to said tuner whereby data contained in the display memory area will be modulated onto the radio frequency signaling produced by said tuner to permit the display memory storage area contents to be viewed on said television set; receiver apparatus to receive the control signaling produced by said hand held remote control device; a microprocessor and associated memory for storage of a control program and data said microprocessor connected to said receiver apparatus to process the control signaling received from the hand held remote control device and connected to said display memory storage area whereby the data and symbols of the display memory area may be modified and updated by the microprocessor to affect the information display appearing on said television set and connected to said modem whereby data and supervisory signaling may be initiated by said microprocessor for delivery to the public switched telephone network and data and supervisory signaling may be received and acted on by said microprocessor; said set top unit further including a TV inlet for connection to a cable TV system; said tuner being connected to said TV inlet whereby television programming delivered by the cable TV system can be tuned to specific program channels by said tuner in response to buttons depressed on said hand held remote control device by commands received from the microprocessor to which it is connected, said microprocessor producing said commands in response to the control signaling received by said receiver apparatus from the hand held remote control; said modem apparatus further including an audio signaling output for carrying voice band audio signaling delivered to the subscriber over the public switched telephone network; said tuner further including an audio output port for delivery of the audio portion of the specific program selected and an audio input port for modulation of the input audio signal received thereon onto the radio frequency signaling produced by said tuner thereafter being the audio heard from said television set; an audio selection means responsive to commands received from said microprocessor having two audio signaling input ports, the first said port being connected to the audio signaling output of said modem and the second said port being connected to the audio signaling output port of said tuner, and an audio signaling output port whereby said audio signaling output port has present on it the audio signaling selected from either the modem or the TV tuner; volume control means responsive to control signaling received from said microprocessor having an input port connected to said audio signaling output of said audio selection means and an audio output port connected to said tuner whereby the audio signaling level of said output port is varied upward and downward by the microprocessor in response to commands received by the receiver apparatus in response to control signaling produced by said hand held remote control device to increase or decrease the sound level of the audio output from said television set.

BRIEF DESCRIPTION OF THE DRAWINGS

FIG. 4-1 is a high-level data flow diagram of the process which operates the set top microprocessor.

FIG. 4-2 is a data flow diagram of the IR receiver Manager.

FIG. 4-3 is part 1 of the data flow diagram for the Interface Manager.

FIG. 4-4 is part 2 of the data flow diagram for the Interface Manager

FIG. 4-5 is a data flow diagram of the Modem Manager.

FIG. 4-6 is a data flow diagram for the Frame Manager.

FIG. 4-7 is a data flow diagram for the ADSI Manager.

FIG. 4-8 is a data flow diagram of the LATA Manager.

DESCRIPTION OF THE PREFERRED EMBODIMENT

Figure 1:
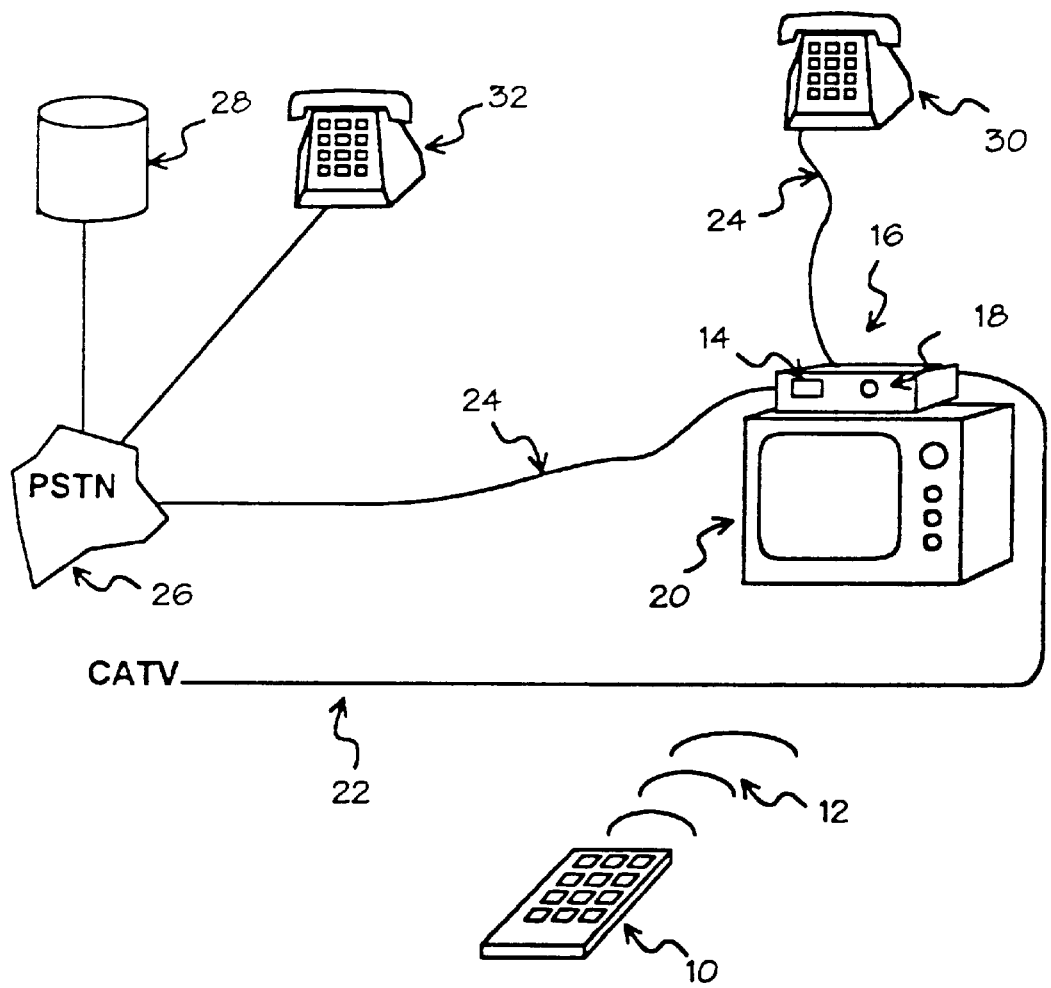
FIG. 1 is a functional block diagram of a subscriber installation using the apparatus of the present invention.

A detailed description of the preferred embodiment together with useful variations now follows with reference to like features of the invention bearing the same reference numerals in the Figures throughout.

Referring to FIG. 1, which shows a functional block diagram of a subscriber installation using the apparatus of the present invention. Each subscriber is provided with a hand held Input device 10 which is provided with a key pad having numerous buttons which will be described in more detail with reference to FIG. 2. The hand held input device 10 communicates the selections of the subscriber, as indicated by the subscriber depressing one or more of the buttons of the key pad, by emitting a control signal 12 which is detected by detector 18 of the set top unit 16 that is typically located above or near the subscriber's television set 20. It is preferred to use an infra red beam of light for control signal 12 as this is a conventional method for communicating with television sets and channel selectors as currently found in subscriber's homes at the present time. The set top unit 16 is typically provided with an input for a cable TV service cable 22 that may be directly connected to the set top 16 or the cable TV service cable 22 may connect with other devices that the subscriber has such as a VCR or pay TV decoder (not shown) etc. before or after being connected to the set top 16. The set top 16 has a radio frequency (RF) output which connected to the RF input of the television set to enable the set top to encode information on the RF output that will be displayed on the TV 20 as will be explained in more detail with reference to FIG. 3.

Additionally, the set top unit 16 is connected with the telephone service that is traditionally delivered to the subscriber's home over twisted pair copper cable 24. The interconnection of the set top 16 with the telephone service cable 24 enables the set top to initiate and receive data communications over the public switched telephone network 26 to interact with data bases or other services, such as voice and interactive voice response services 28 to obtain any one of a number of services that are currently provided or planned to be provided to the home as discussed in various newspapers and technical journals such as home shopping, bulletin board news services, stock quotes, home banking, voice mail, electronic mail and visually enhanced variations thereof etc. The data communications will occur in a manner that is compliant with the Analog Display Services Interface (SR-INS-002495, Guidelines for writing Applications Which Use the Analog Display Services Interface (ADSI) for Data Communications, Issue 1, Bellcore, December 1992; TR-NWT-001 273, Generic Requirements for an SPCS to Customer Premises Equipment Data Interface for Analog Display Services, Issue 1, Bellcore, December 1992; SR-TSV-002476, Customer Premises Equipment Compatibility Considerations for the Voice Band Data Transmission Interface Generic Requirements, Issue 1, Bellcore, December 1992) Bellcore specifications. Also shown at the subscriber home is a telephone hand set 30 which can be used to carry on a telephone conversation with a remote subscriber using their hand set 32 in the normal manner.

At the front of set top unit 16 is shown an indicator display 14 which is used to indicate to the subscriber operating information relating the set top unit. The items of information that can be made available to the user from the display 14 are described in more detail in relation to the description of FIG. 3.

Figure 2:
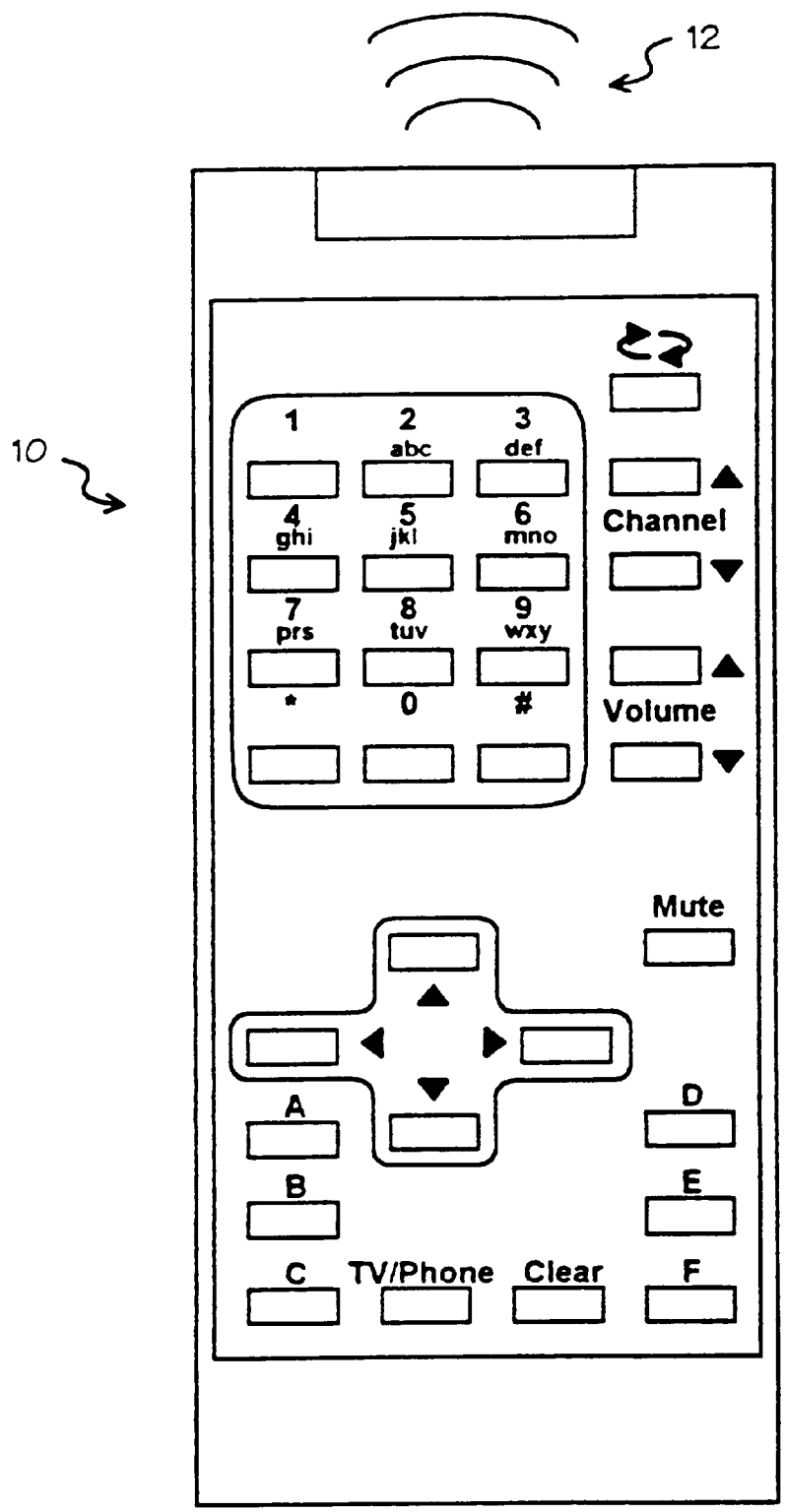
FIG. 2 is a detailed plan view of a subscriber hand held input device in accordance with the system of the present invention.

Referring now to FIG. 2 which illustrates a detailed plan view of a subscriber hand held input device in accordance with the system of the present invention. The input device 10 is preferably a hand held remote device which is not connected to the set top unit by wires, but rather communicates user selection of the command buttons shown in detail in FIG. 2 by means of a wireless control signal 12. The wireless control signal in the preferred embodiment is an infrared light beam emitted out of light emitting diodes (not specifically shown) contained within the hand held unit. This manner of wireless control of consumer electronic items such as stereos and TVs is common and quite well known in the art. Each labeled button on the input device 10 causes a control signal 12 to be emitted that will be received by the set top unit 16 and acted on by:

1. initiating data dialog on or interaction with the telephone service shown in the table below under the "Active" column as phone; or
2. activating a display on the TV 20 or operating on the audio sound coming out of the TV 20 shown in the table below under the "Active" column as TV.

Depressing the buttons of the control will produce a responding function in the set top unit 16 described in summary in the following table.

| Name | Function | Active |
|---|---|---|
| 1 | Output representation of character one | TV & phone |
| 2abc | Output representation of character two | TV & phone |
| 3def | Output representation of character three | TV & phone |
| 4ghi | Output representation of character four | TV & phone |
| 5jkl | Output representation of character five | TV & phone |
| 6mno | Output representation of character six | TV & phone |
| 7prs | Output representation of character seven | TV & phone |
| 8tuv | Output representation of character eight | TV & phone |
| 9wxy | Output representation of character nine | TV & phone |
| 0 | Output representation of character zero | TV & phone |
| * | Output representation of character asterisk | Phone |
| # | Output representation of character octothorp | Phone |
| ↩ | Change channel to previously viewed channel, display channel number | TV |
| Channel ˆ | Increment the channel, display channel number | TV |
| Channel v | Decrement the channel, display channel number | TV |
| Volume ˆ | Increase volume, display volume graph | TV & Phone |
| Volume v | Decrease volume, display volume graph | TV & Phone |
| Mute | Turn off sound, display "MUTE" | TV & Phone |
| TV/Phone | Toggle display and audio between TV and Phone | TV <> Phone |

TABLE 1

| | | |
|---|---|---|
| Clear | Clears display of all telephony text | TV & Phone |
| A | Output representation of first soft key | Phone |
| B | Output representation of second soft key | Phone |
| C | Output representation of third soft key | Phone |
| D | Output representation of fourth soft key | Phone |
| E | Output representation of fifth soft key | Phone |
| F | Output representation of sixth soft key | Phone |
| ˆ | Scroll active line down screen display to Null line or Bottom | Phone |
| v | Scroll active line up screen display to Null line or Top | Phone |
| > | Replace primary column text display with secondary text display | Phone |
| < | Replace secondary column text display with primary text display | Phone |

Figure 3:
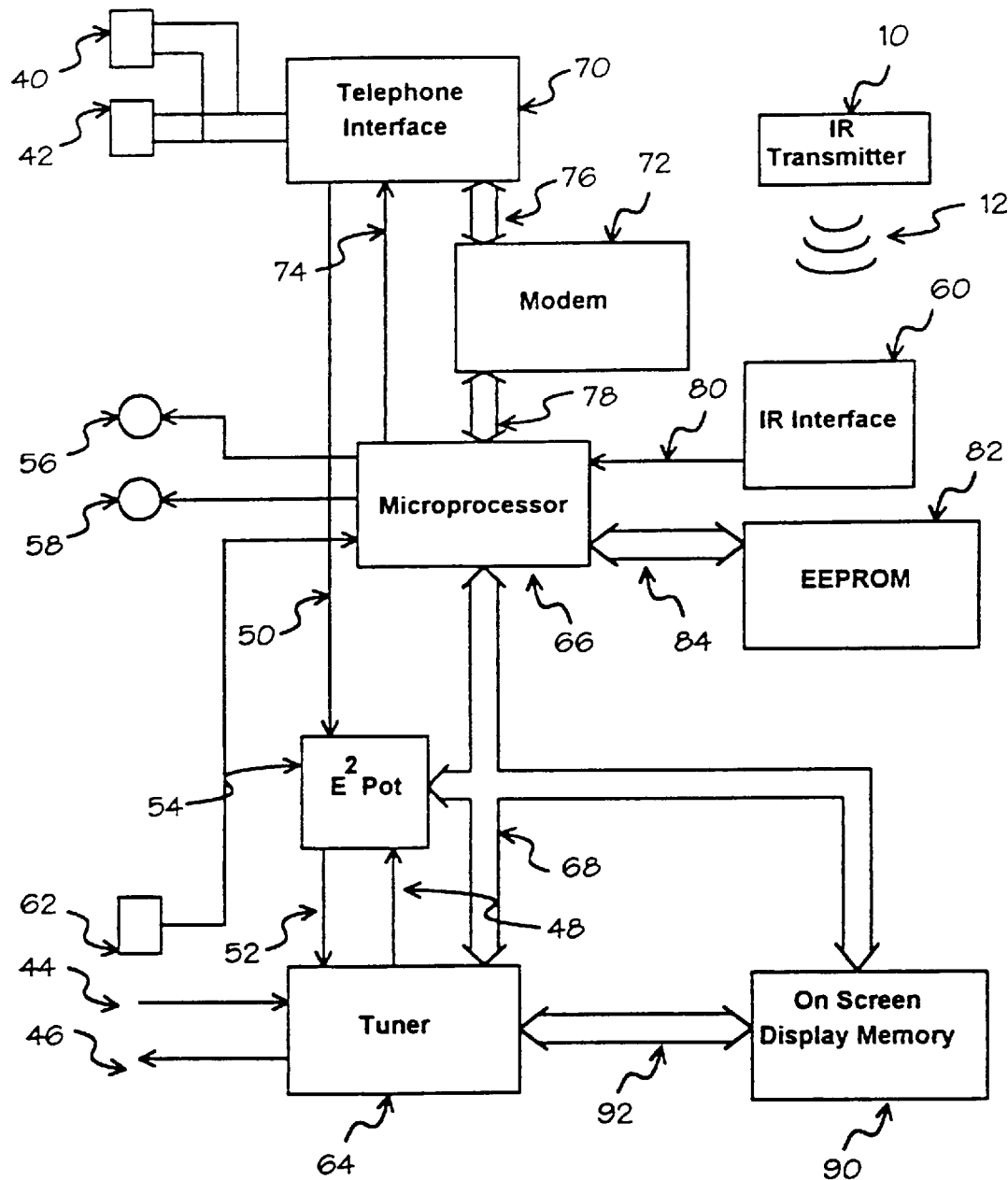
FIG. 3 is a detailed functional block diagram of the major components of the set top unit.

Referring now to FIG. 3 we are shown a detailed functional block diagram of the major components of the set top unit 16. The unit is provided with several external inputs and outputs which are as follows.

RJ11 telephone jacks are provided for interconnection with the telephone network. A first RJ11 outlet 40 is provided for interconnection of the unit with the public switched telephone network 26 (of FIG. 1) and a second RJ11 outlet 42 is also provided on the unit for the convenience of the subscriber who may use outlet 42 to attach a telephone hand set 30 (of FIG. 1) to the unit if desired. The set top unit is further provided with a cable input 44 for reception of cable TV programming. Output to the subscriber's television set is accomplished by providing a TV outlet 46 which is modulated to Channel 2 or Channel 3 depending on the setting the subscriber makes to the channel preference switch 62. The modulated channel output provided on TV outlet 46 includes both visual and audio outputs that will appear on the television screen and over the TV speakers in the customary fashion for broadcast television signals. The audio output to the television through outlet 46 can be taken from either the audio delivered with the user selected channel being viewed or the audio received from the telephone network 26 (of FIG. 1). The set top unit is provided with a television tuner 64 which provides a separated audio output over line 48. This is the audio received by the tuner on the cable broadcast channel selected by the user for viewing. This audio signal is delivered to an audio control unit 54 which contains an analog switch and electrically erasable potentiometer ($E^2Pot$). The audio control unit 54 is provided with 2 audio inputs, one connected to the TV audio line 54, the other connected to telephone audio line 50 which delivers audio signals received by the set top from the telephone network. The analog switch of the audio control 54 is set, in accordance with instructions received from the microprocessor 66 over the processor peripheral control bus 68, to select the audio signal received over the telephone audio line 50 or the TV audio line 48. The selected audio signal is then scaled by the electrically erasable potentiometer ($E^2Pot$) to a user set amplitude (which may be varied by the user in accordance again with the control commands received by the $E^2Pot$ over the processor peripheral control bus 68). The scaled audio signal is then delivered to the tuner 64 over the output audio line 52. Within the tuner 64 the audio signal received on the output audio line 52 is modulated into the video signal delivered to the subscriber's television through the TV output line 46. A suitable tuner for incorporation into a set top unit is manufactured by Sharp and is available under part number RFS07US3.

The set top unit is also shown as having a power on indicator 58 which is preferably positioned at the rear of the set top unit and emits a visible light which the subscriber can observe to determine If the set top unit is powered up or not. Also provided at the front of the set top unit is a message waiting indicator 56 that produces a visual indication if there is a message waiting to be retrieved by the user. The waiting message could be text or audio and will be delivered to the subscriber at the request of the subscriber.

The set top unit is also provided with a control signal receiver 60 which is used to receive commands from the subscriber as encoded on the control signal 12 detected by the control signal receiver 60. In the preferred embodiment, infra red signaling is used as a reliable, readily available method of providing wireless communication between the hand held input device 10 and the set top unit. The received signaling is converted to digital electrical signaling that is communicated to the microprocessor over the digital subscriber control line 80. A suitable device for implementing the functions of a control signal receiver is the IR receiver manufactured by Sharp under part number GP1U7ZQ.

The telephone signaling present on the telephone input RJ11 jack, 40 or 42 is processed by telephone interface 70 which is used for all manner of communication between the set top and the public switched telephone network. The interface 70 can go on-hook, off-hook, detect ringing and generally provide all the necessary line monitoring, filtering, isolation, protection and signal conversion functions for connection of high performance modems to the public switched telephone network. A suitable telephone interface is manufactured by Silicon Systems under part SSI 73M9001. The telephone interface is provided with an audio output port which is connected to telephone audio line 50 and is used to deliver voice band signaling, typically voice response audio, to the tuner as described previously. The on-hook, off-hook, ring-detect etc. state of the telephone line is communicated to the microprocessor over the telephone control line 74 thereby enabling the microprocessor to exercise control over the telephone signaling originating from or terminating at the set top unit. Data communications are exchanged between the modem 72 and the telephone interface 70 over the analog data bus 76. The function of the modem 72 is to convert the digital data needed by the microprocessor 66 to the voice band analog data needed for transmission over the public switched telephone network. A suitable modem for use in the present system is manufactured by Silicon Systems under part number SSI 73K312L. Data transmitted or received by the modem 72 are communicated to the microprocessor over the digital telephone data bus 78.

Microprocessor 66 obtains program and certain messages and interactive text by communication with an electrically erasable programmable read only memory (EEPROM) 82 via the EEPROM addressing and data bus 84. The control program operating the microprocessor will be explained in greater detail in relation to FIG. 4. The microprocessor itself will contain read only memory (ROM) for storage of frequently used portions of the control program detailed in FIGS. 4-1 thru 4-8 and random access memory (RAM) for storage of changing information such as volume levels etc. for use in its operation. In selecting an external memory 82 microprocessor 66 pair for use in the system, it is preferable that as little addressing and data traffic as possible appear on the bus 84 to minimize unwanted interference being produced in the video signaling delivered by the set top unit out of TV outlet 46. It is advantageous to use the 87C575 microprocessor manufactured by, for example Phillips Semiconductors under the Signetics product line which is provided with 8 kilobytes of ROM and 256-bytes of RAM.

The set top unit is also provided with an On Screen Display 90 having a memory that provides a text storage area accessible by the microprocessor 66 for use as a scratch pad area for placing text and graphics that are to be displayed on the subscriber's television set 20. Text or graphics to be displayed are placed on the processor peripheral controller bus 68 and placed in memory in the On Screen Display 90. The microprocessor determines when the conditions are met to display the On Screen Display 90 contents on the television set and directs the tuner 64 to overlay or replace the television programming emitted from the tuner with the data obtained from the On Screen Display 90 as provided to the tuner over the display memory bus 92. An on screen display memory unit that may be advantageously used in the apparatus described herein is manufactured by NEC under part number PD6450.

In FIGS. 4-1 thru 4-8 are shown data flow diagrams illustrating the functional components of the software needed to operate the set top unit.

The software functions are portions of computer code that carry out a function that is described herein and are denoted by elliptical symbols in the figures. The hardware elements are generally denoted as square boxes and share the same labels and reference numbers as in the hardware FIGS. 1 thru 3. The square boxes labeled as timers (i.e. IR Timer in FIG. 4-2, Display Timer in FIG. 4-3) are not separate specific hardware timers 20 needed in the construction of the apparatus, but rather are timer registers located in the microprocessor 66 itself. The exchange of data between the software functions or the hardware is denoted by the arrows joining the symbols in the drawings. The data flows in the direction shown by the arrow head. Where a line is provided with an arrow head at each end of the joining line, the data flow is bidirectional.

Figures 1, 4:
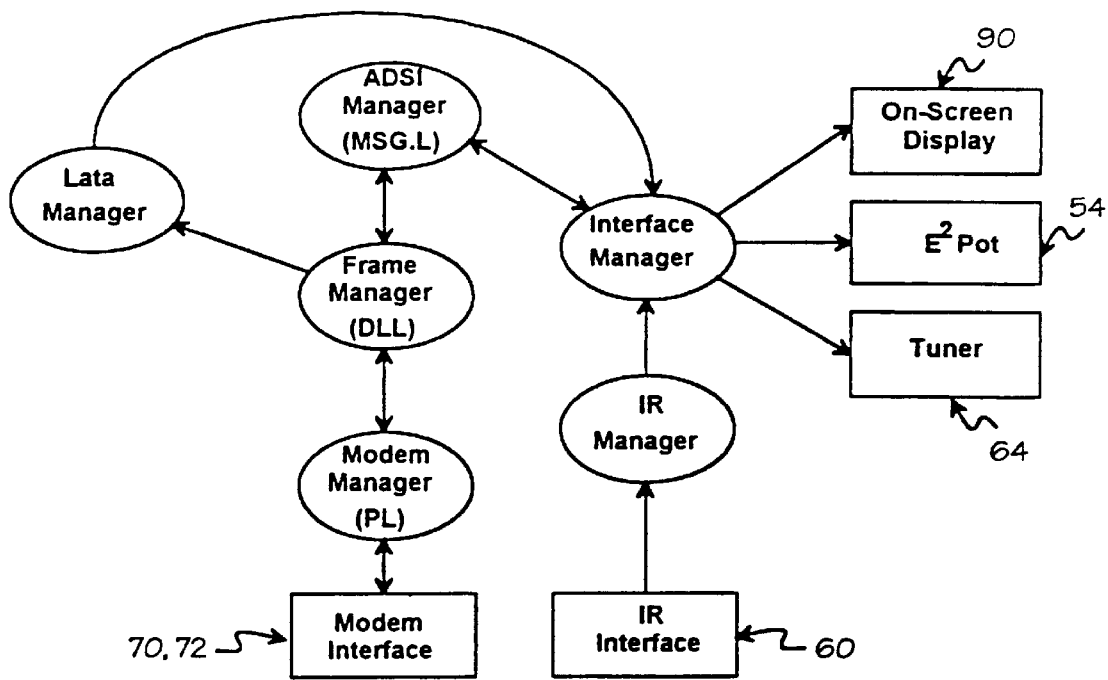
Figures 2, 4:
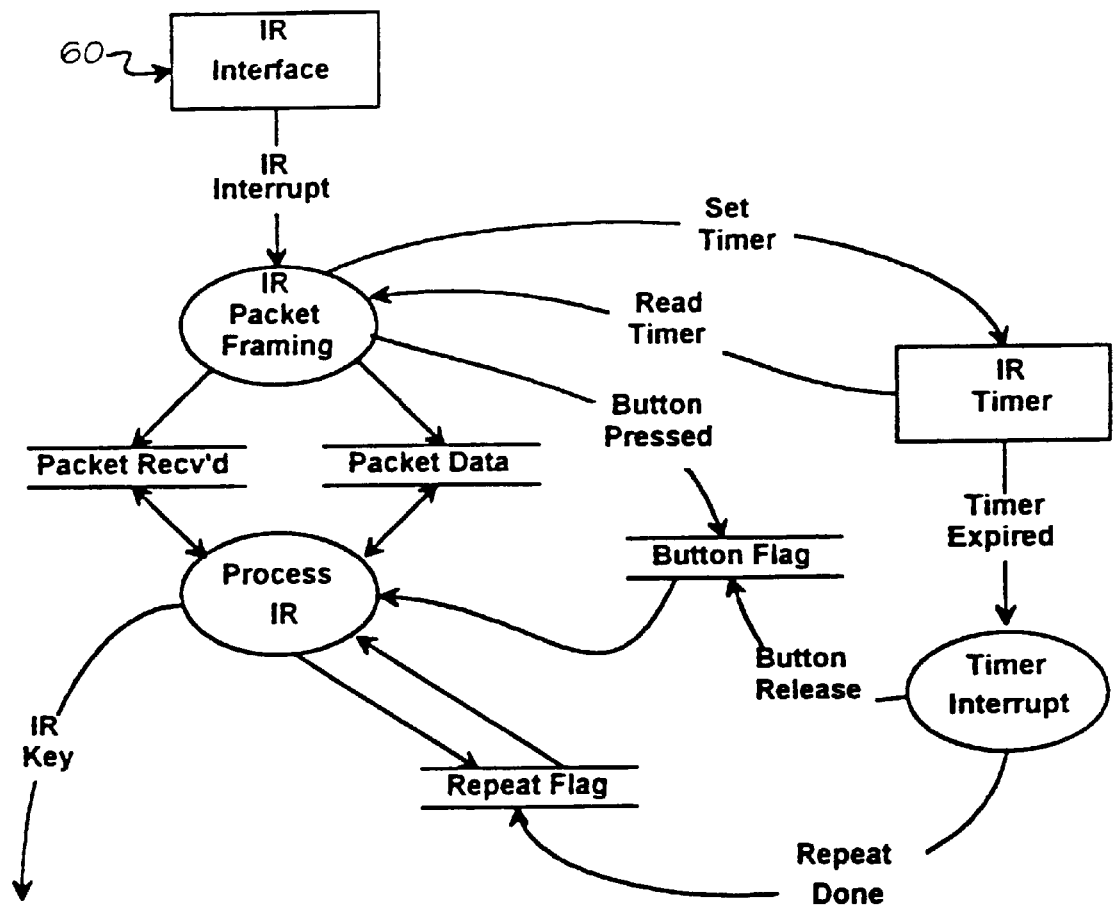
Figures 3, 4:
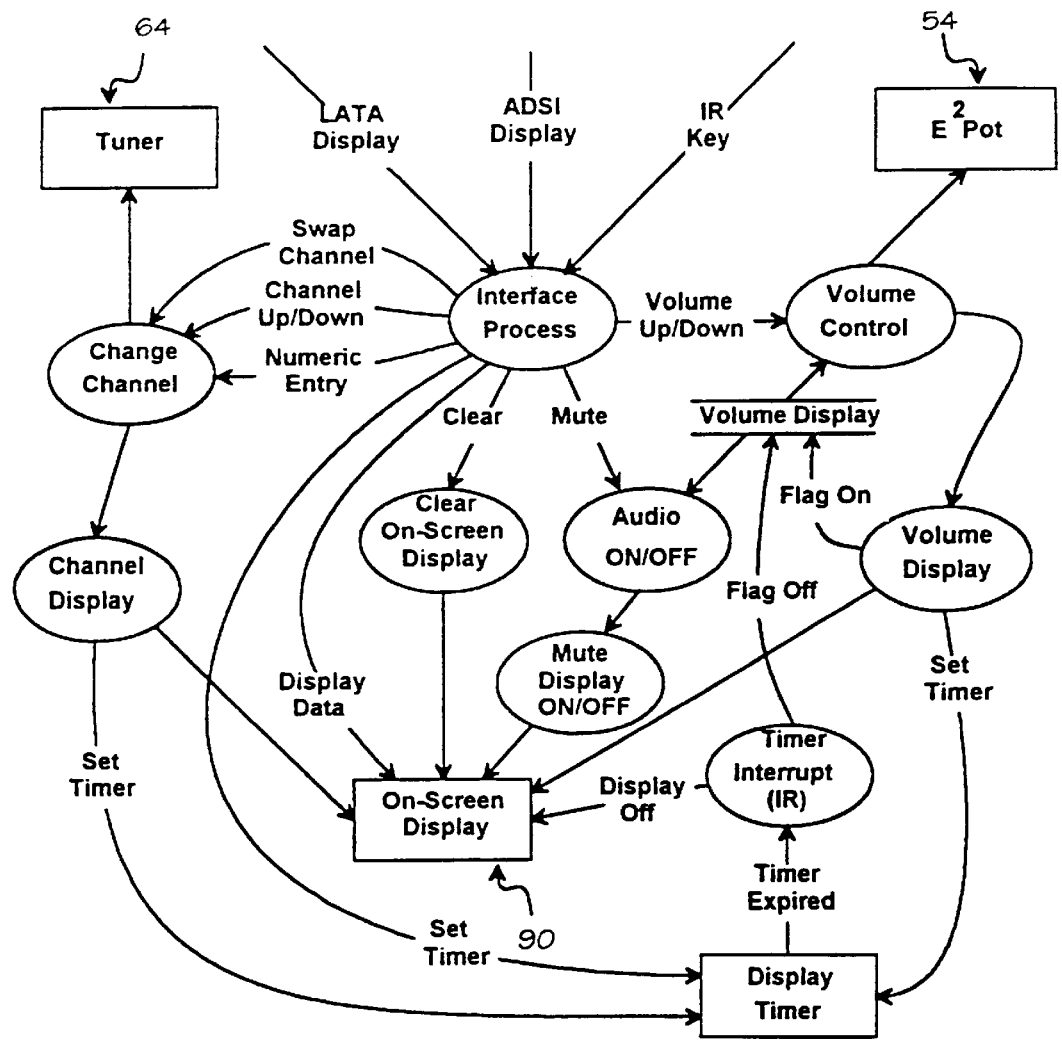
Figure 4:
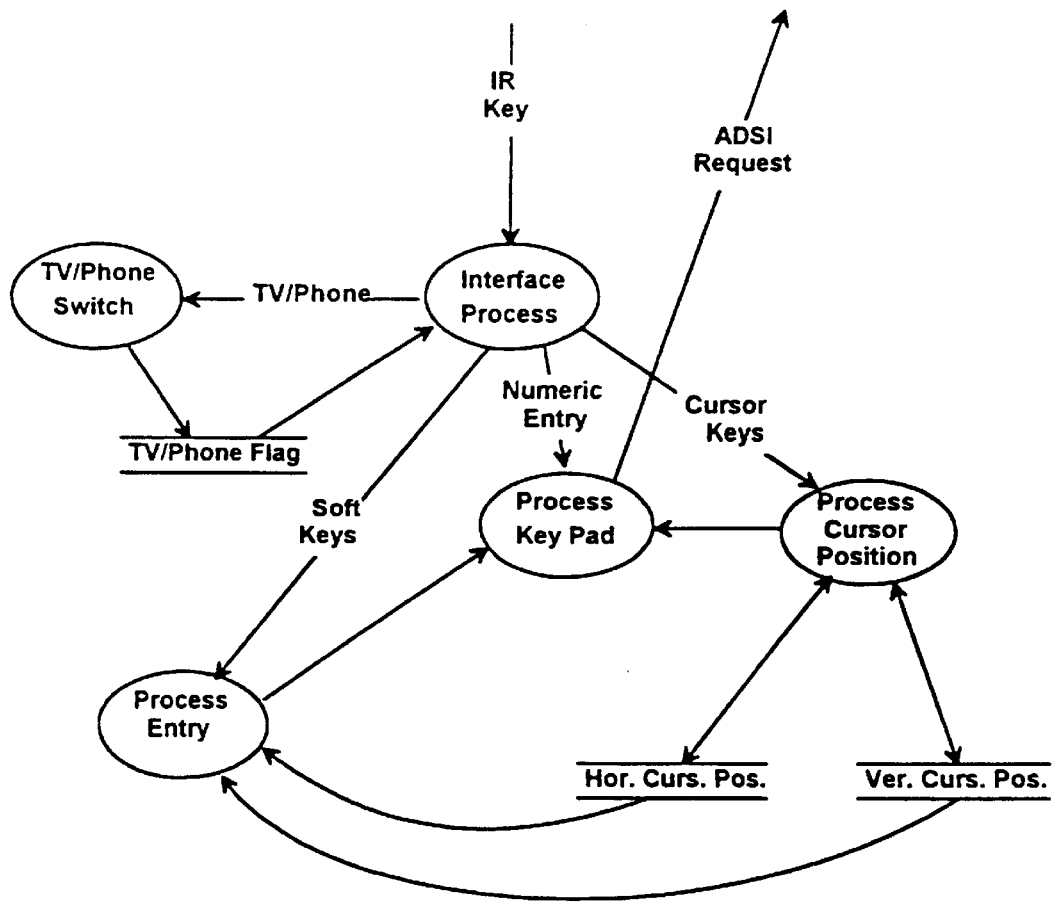

Referring now to FIG. 4-1, there is shown a high-level data flow diagram of the process which operates the microprocessor 66 of the set top unit 16. The process interfaces with the telephone interface 70 and modem 72 via a Modem Manager (PL) which denotes the Physical Layer compliant with the ADSI protocol (IBID[8] pp. 3-1 to 3-3) defined by Bellcore. The actual functioning of this Modem Manager will be discussed in greater detail with reference to FIG. 4–5 following. At this point, suffice it to say that the Modem Manager transmits and receives data from the modem and passes that data up to the Frame Manager (DLL) which denotes the Datalink layer of the ADSI protocol (IBID[3] pp. 3-3 to 3-20). The Frame Manager is mandated to process the data in accordance with the Bellcore specification and the details of the processing that is performed will be explained in more detail with reference to FIG. 4–6 following. The Frame Manager in turn exchanges data with the ADSI Manager (MSG.L) which denotes the Message layer of the ADSI protocol (IBID[8] pp. 3-20 to 3-26). The ADSI manager processes the data in accordance with the Bellcore specification and the details of the processing that is performed will be explained in more detail with reference to FIG. 4–7 following. The Frame Manager (DLL) also exchanges information with the LATA Manager and the functioning of the LATA manager will be discussed in greater detail with reference to FIG. 4–8.

The Interface Manager is responsible for the real time processing of the user commands received from the IR interface and acting on those commands to alter the On Screen Display 90, or adjust the TV volume level or audio source by adjusting the $E^2$Pot 54 levels or change the TV channel by issuing commands to the Tuner 64. The Interface Manager will also act on data received from the ADSI Manager and the LATA Manager to alter the On Screen Display 90 or carry out other functions as will be described in detail with reference to FIGS. 4-3 and 4-4.

Referring now to FIG. 4-2 the manner of operation of the IR Interface of FIG. 4-1 will be explained in more detail. On receipt of signaling from the hand held input device 10, the IR Interface 60 produces an interrupt which causes the microprocessor to initiate the IR Packet Framing interrupt handler module. The IR Interrupt is produced for every falling transition, or bit, of the inbound signaling and since button or command identification requires several bits, 15 typically, numerous IR Interrupts will be triggered by depressing a button on the hand held input device 10. The IR Packet Framing module collects the signaling produced by the IR Interface and assembles the signaling into the Packet Recv'd Buffer. When a complete IR command has been processed the Packet Data flag is set to let the Process IR module process the data that has been collected in the Packet Recv'd buffer to produce an IR Key message that will be passed to the Interface Manager detailed in FIG. 4-3. At the outset of receipt of control signaling, the IR Packet Framing interrupt handler reads the IR Timer contents obtaining a Read Timer message and then issues a Set Timer message that sets the IR Timer. This IR Timer is used to determine the bit value received, i.e. is it a "1" or a "0" and to determine whether the hand held control button is depressed or released. A Timer Expired interrupt is produced which activates the Timer Interrupt process only after a per determined time which denotes that the user is not depressing any button on the hand held remote control 10. The Timer Interrupt process will then set the Button Flag off and set the Repeat Flag to off.

At the outset of receipt of IR Interrupts, the IR Packet Framing process will produce a Button Pressed message that will set the Button Flag to true and the IR Packet Framing process will accumulate the received bits in the Packet Data memory. Once a complete set of bits for a button have been received (i.e. 15), the IR Packet Framing process will set the Packet Recv'd flag to true. When the Packet Recv'd flag is true, the Process IR process will initiate and will set the Packet Recv'd flag to false and will read the Packet Data memory to get the command just received and will then clear the Packet Data memory. The Process IR process will next read the Repeat Flag which stores the last IR Key message that was sent out by the IR Manager, if the last IR Key message and the current button or command are the same, the Process IR process will produce IR Key message only if the current button or command is a repeatable command such as Volume Up, Volume Down, Channel Up or Channel Down.

If the current command or button is the same as the one contained in the Repeat Flag and not a repeatable command, the Process IR process will then read the Button Flag to determine if the hand held control button has been released which is denoted by a Button Flag of False; where this is the case, the Process IR process will produce an IR Key message corresponding to the button depressed. This checking is done to allow the Process IR process to produce only one message for each time the operator of the hand held remote control 10 is depressed even when the button is depressed for a relatively long period of time producing several Packet Data messages.

Referring now to FIG. 4-3 we are shown part 1 of the data flow diagram for the process labeled Interface Manager of FIG. 4-1. The Interface Manager provides the outputs that control the Tuner 64 causing the channel that is displayed on the TV 20 to change. The Interface Manager provides the outputs that control the $E^2$Pot 54 to control the audio source (explained in more detail with reference to FIG. 4-4) whether it is to be the telephone or the television audio and also adjust the volume level of the audio output of the TV 20 by changing the settings of the $E^2$Pot 54.

The Interface Manager provides the outputs to control the information being shown by the On Screen Display 90 such as text that will be illustrated herein and the "MUTE" display when the TV audio is turned off or muted and whether the On Screen Display 90 is active (i.e. being displayed on the TV) or not.

The Interface Manager receives an ADSI Display input message from the ADSI Manager (detailed in FIG. 4-7) shown as the ADSI Display data path. The input ADSI Display data is processed by the Interface Process to pass a Display Data message to the On Screen Display 90 or to produce a Clear message to the Clear On Screen Display process which will either deactivate the On Screen Display 90 from being shown on the TV 20 or will clear the contents of the memory of the On Screen Display. The ADSI Display message, may also produce a Mute message for the Audio ON/OFF process when an incoming call is received. There are several types of ADSI messages that can be displayed by the On Screen Display 90 and sample illustrative messages are described in reference to FIG. 4-7.

The Interface Manager also receives input message data from the IR Manager (detailed in FIG. 4-2) and those messages are processed as follows. Depressing the Swap Channel button of the hand held control 10 causes an IR Key message to arrive at the Interface Process on the IR Key data path. The Interface Process produces a Swap Channel message that is passed to the Change Channel process. The Change Channel process processes this message and causes the Tuner 64 to change to the channel specified by the Swap Channel message. The Change Channel process also produces a message to the Channel Display process, which causes the newly selected channel number to be passed to the On Screen Display 90 and displayed on the TV 20. Also, the Channel Display process produces a Set Timer message which sets the Display Timer clock which will time the period that the channel number will be displayed by the On Screen Display. Once the channel number has been displayed for a preset period of time, several seconds for example, the Display Timer will produce a Timer Expired interrupt that will be processed by the Timer Interrupt (IR) interrupt handler process. The Timer Interrupt (IR) interrupt handler process with produce a Display Off command that will cause the On Screen Display 90 to cease displaying the channel number. Depressing the Channel Up "^", Channel Down "v" or the numeric entry keys of the hand held remote control to select a numbered channel will cause corresponding data messages to be produced by the Interface Process and handed off to the Change Channel process to be handled in a manner similar to that just described for the Swap Channel button above.

Depressing the Volume Up "^" or Volume Down "v" button on the hand held input device 10 causes the IR Key data to arrive at the Interface Process which produces a Volume Up/Down message that is passed to the Volume Control process. The Volume Control process produces signaling to the E²Pot 54 causing the audio level being produced by the TV to increase or decrease depending on which button the user pushed on the hand held input device. A Volume Display buffer is updated to the new volume level and the Volume Display process is passed a message to notify it that a volume level change has occurred. The Volume Display process produces signaling to the On Screen Display 90 to activate a volume level display which shows the user a graphical representation of the volume level. The Volume Display process also produces a Set Timer message which is processed by the Display Timer module to set a predetermined time for the display of the volume level on the TV screen. Once the volume level has been displayed for a preset period of time, several seconds for example, the Display Timer will produce a Timer Expired interrupt that will be processed by the Timer Interrupt (IR) interrupt handler process. The Timer Interrupt (IR) interrupt handler process with produce a Display Off command that will cause the On Screen display 90 to cease displaying the volume level.

Depressing the Mute button on the hand held input device 10 causes the IR Key data to arrive at the Interface process which produces a Mute message that is passed to the Audio ON/OFF Process. The Audio ON/OFF process produces signaling to the E²Pot 54 (control path not shown) causing the audio level being produced by the TV to be toggled on or off. A mute display message is passed to the Mute Display On/Off process to notify it that a mute setting change has occurred. The Mute Display On/Off process produces signaling to the On Screen Display to activate a "MUTE" display which shows the user a visual representation that the audio is now muted or not muted.

The Interface Process receives input LATA Display message data from the LATA Manager (detailed in FIG. 4-8) which is processed by the Interface Process to produce Display Data messages that are sent to the On Screen Display 90. The contents of these messages will be illustrated in more detail with reference to FIG. 4-8.

Referring now to FIG. 4-4 the processing of the Interface Manager of FIG. 4-1 to produce outbound ADSI telephone requests as selected by the user using the hand held input device 10 will now be explained. This portion of the Interface Manager is brought into operation when the user depresses the TV/Phone button of the hand held control as shown in FIG. 2. Depressing the TV/Phone button causes an IR Key message to be delivered to the Interface Process which in turn produces a TV/Phone message that is delivered to the TV/Phone Switch process. The TV/Phone Switch process toggles the television audio source between the TV signal audio produced by the tuner 48 or the telephone audio 50 of FIG. 3. A TV/Phone flag is set to record which audio source is currently selected. When the Phone audio is active, depressing the numeric keys of the hand held input device 10 causes the Interface Process to produce Numeric Entry messages that are delivered to the Process Key Pad process. The Process Key Pad process takes the numeric entry keys and produces an ADSI Request message that is delivered to the ADSI Manager which is described in more detail with reference to FIG. 4-7.

The input device 10 is also provided with "Soft Keys" labeled "A" "B" "C" "D" "E" and "F". Depressing one of these keys causes the Interface Process to produce a Soft Keys message that is delivered to the Process Entry process. When a soft key is depressed, the Process Entry process will examine the Hor. Curs. Pos. data and the Ver. Curs. Pos. data to locate a selection made by the user from the data displayed on the screen and produce a message containing the user selection for delivery to the Process Key Pad process. The Process Key Pad process will in turn produce an ADSI Request message that will be delivered to the ADSI Manager for processing as explained in detail with reference to FIG. 4-7.

The input device 10 is also provided with 4 cursor positioning keys labeled "^" "v" ">" and "<". Depressing one of these keys causes the Interface Process to produce a Cursor Keys message that is delivered to the Process Cursor Position process. When a cursor key is depressed, the Process Cursor Position process will update the Hor. Curs. Pos. data and the Ver. Curs. Pos. data to locate the cursor to a selection made by the user from the data displayed on the screen and produce a message containing the user selection for delivery to the Process Key Pad process. The Process Key Pad process will in turn produce an ADSI Request message that will be delivered to the ADSI Manager for processing as explained in detail with reference to FIG. 4-7.

Figures 4, 5:
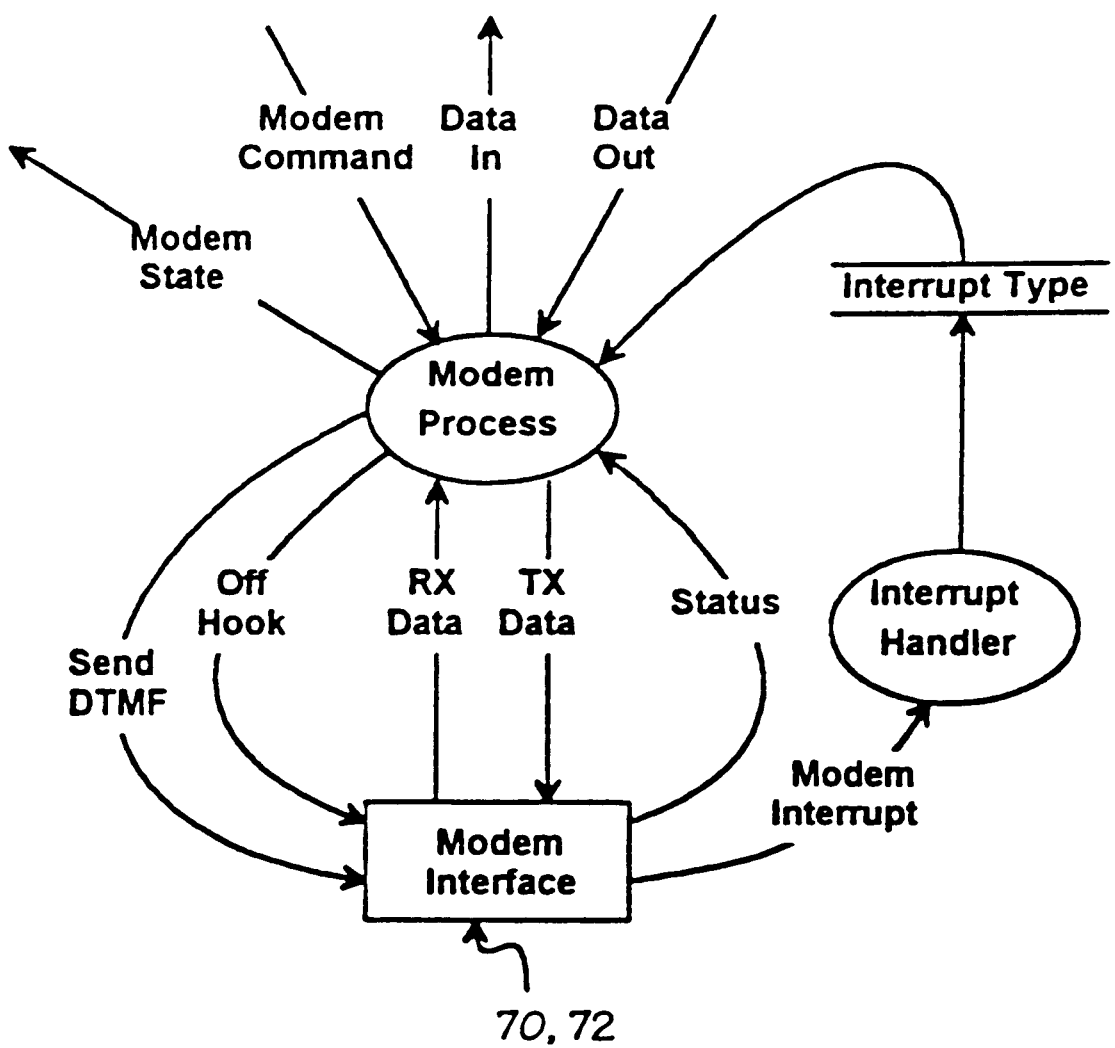

Referring now to FIG. 4-5 there is shown a more detailed data flow diagram of the Modem Manager process of FIG. 4-1. The Modem Manager process controls the telephone interface 70 and modem 72 of FIG. 3 and for the purposes of the discussions here, both hardware elements are referred to simply as the Modem Interface 70, 72. Telephone activity on the telephone line 26 is reacted to by the Modem Interface by producing a Modem Interrupt that is processed by the Interrupt Handler process. The interrupts are typed according to the nature of the telephone activity. There can, for example, be an interrupt to signal ringing voltage on the telephone line for incoming calls. A modem interrupt for data being received by the modem. A special tone interrupt for signaling a busy signal or ringing tone on the telephone line. Other interrupts can occur depending on the type of hardware being used for the modem and telephone interface functions.

The Modem Process receives data from the Frame Manager as shown in FIG. 4-1. That data can take the form of a Modem Command message or actual data that is to be sent over the PSTN 26 which arrives at the Modem Process as a Data Out message. A Modem Command message received by the Modem Process is acted on in one of many ways. The Modem Command message can request the Modem Process to produce a Off Hook (or On Hook) message that will cause the Modem Interface 70, 72 to pick up (go Off Hook) or hang up (go On Hook) the telephone connection. The Modem Command message can request the Modem Process to produce Dual Tone Multifreqency (DTMF) dial signaling which will cause the Modem Interface to send dialing digits into the telephone network for connecting to or dialoging with another subscriber or audio or data service. The Modem Command message can also cause the Modem Process to determine the Modem Interface 70, 72 status whereupon the Modem Interface will produce a Status message and the Status message received will be processed by the Modem Process to produce a Modem State message indicating the present status of the Modem Interface.

Data received by the Modem Interface 70, 72 from the PSTN 26 is passed as RX Data to the Modem Process where it is formed into Data In messages that are processed by the Frame Manager for delivery to the appropriate process within the set top unit 16. Any messages to be delivered to the PSTN 26 are received by the Modem Process as a Data Out message which the Modem Process passes to the Modem Interface as TX Data.

Figures 4, 5, 6:
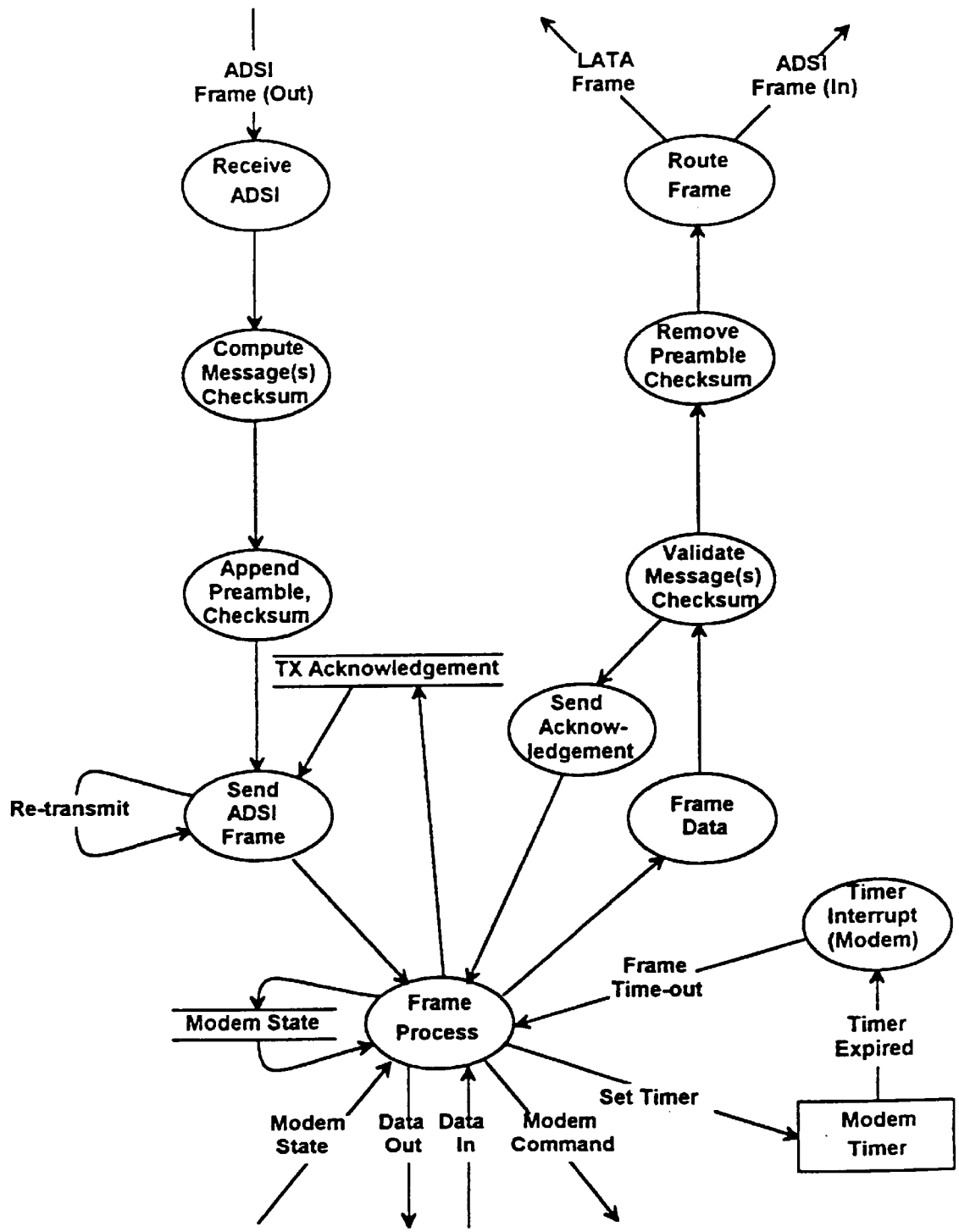
Figures 4, 5, 6, 7:
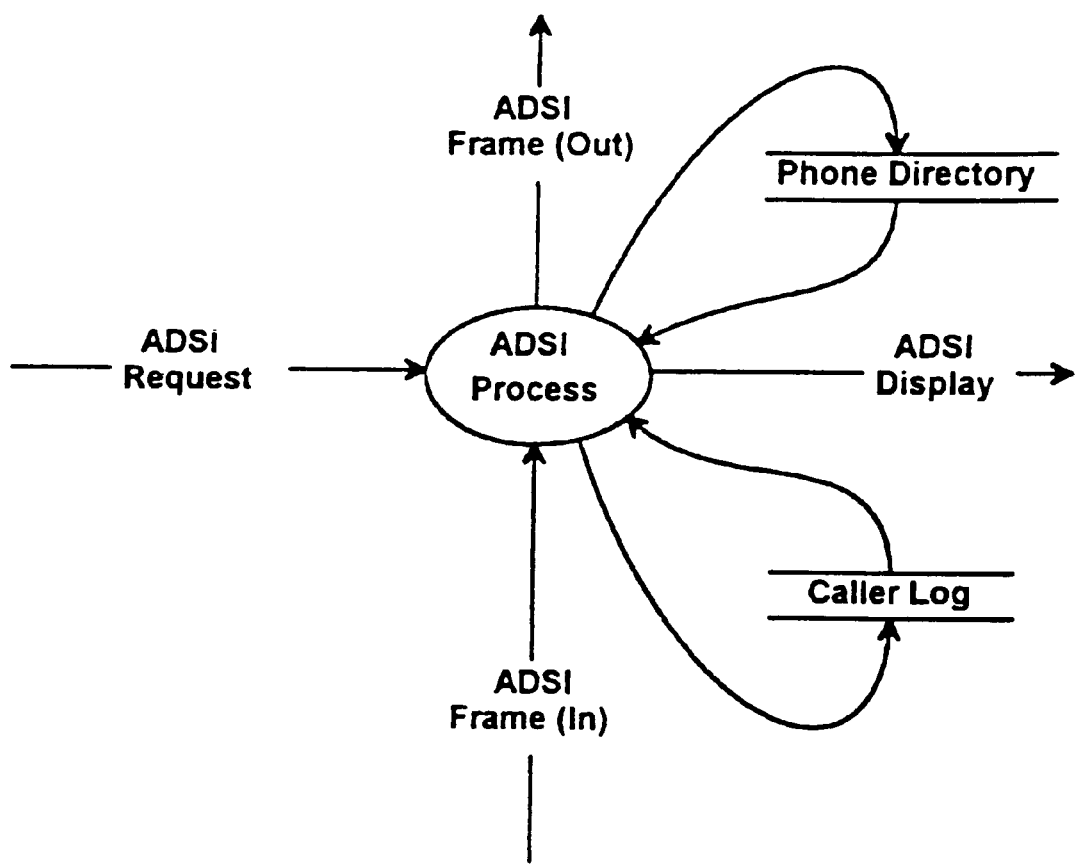
Figures 4, 5, 6, 7, 8:
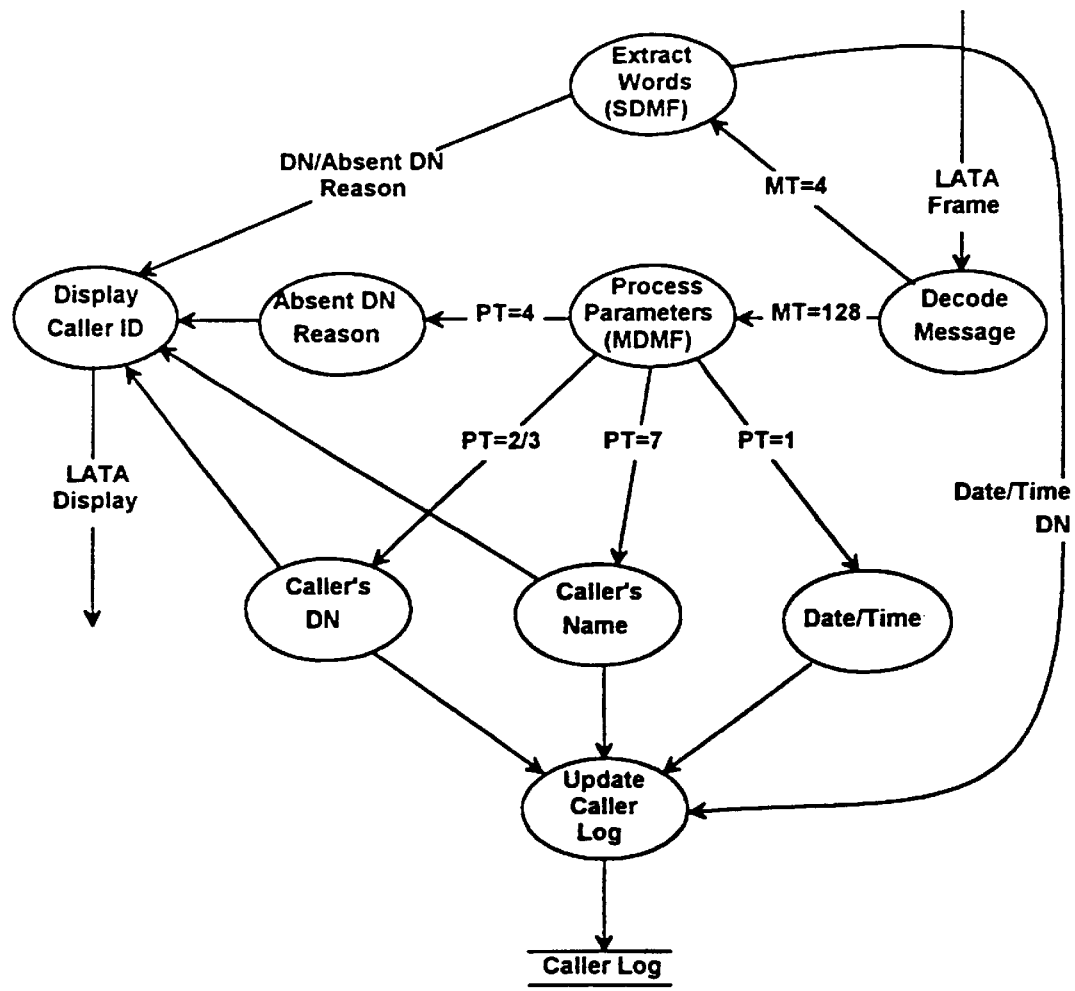

Referring now to FIG. 4-6 there is shown in more detail the data flow diagram for the Frame Manager of FIG. 4-1. ADSI frames produced by the set top unit 16 are delivered to the Receive ADSI process of the Frame Manager as ADSI Frame (Out) messages. The Receive ADSI process passes the message to the Compute Message(s) Checksum process which computes an error checking redundant bits checksum that the Append Preamble, Checksum process appends to the frame or message to enable the receiving ADSI process (connected with over the PSTN 26) to check the validity of the message when received. The prepared message is delivered to the Send ADSI Frame process which passes it to the Frame Process for delivery to the Modem Process (of FIG. 4-5) as a Data Out message. The ADSI protocol calls for acknowledgment of sent ADSI frames and the Frame Process monitors incoming data to the modem received by the Frame Process as Data In. When an acknowledgment is received, the Frame Process updates the TX Acknowledgment flag which is queried by the Send ADSI Frame process. If the Send ADSI frame process does not receive an acknowledgment of the ADSI frame after sending it, it will Re-transmit the unacknowledged frame again and again at predetermined time intervals until the frame transmission receives an acknowledgment.

A converse method occurs for ADSI and LATA frames that are received by the Set Top unit 16. These inbound messages or frames are delivered to the Frame Process as Data In by the Modem Manager of FIG. 4-5. When Data In data indicates a frame has begun to arrive, the Frame Process will cause a Set Timer message to be sent to the Modem Timer. As the inbound Data In frame data arrives, it is passed to the Frame Data process for further processing. If only part of a frame arrives, the Modem Timer will expire causing a Timer Expired interrupt to be produced that will invoke the Timer Interrupt (Modem) interrupt handler process which in turn will invalidate the partly received message or frame by creating a Frame Time-out message which is delivered to the Frame Process. A fully received frame will be passed by the Frame Data process to the Validate Message(s) Checksum process which will perform validation calculations to determine if the received frame was received intact. Receipt of an intact frame is indicated by the Validate Message(s) Checksum process to the Send Acknowledgment Process which causes a TX Acknowledgment message to be produced and sent out over the PSTN 26 through the Frame Process as a Data Out message passed to the Modem Manager of FIG. 4-5. The Validate Message(s) Checksum process will pass the validated message or frame to the Remove Preamble, Checksum process that will remove the redundant checksum and addressing information from the frame and in turn pass the message frame itself to the Route Frame Process. The Route Frame Process will examine the message to determine if it is a LATA Frame message or an ADSI Frame (In) message and route the frame to the appropriate LATA Manager or ADSI Manager.

Referring now to FIG. 4-7 there is shown the data flow diagram for the ADSI Manager of FIG. 4-1 in more detail. The ADSI Manager performs an ADSI Process which routes the ADSI Request messages received from the user's operation of the hand held input device 10. These user created ADSI Request messages are processed by the ADSI Process to produce an ADSI Display message which is used update the ADSI information being displayed on the television set 20 and/or produce ADSI Frame (Out) messages that are delivered to the PSTN 26. In bound telephone calls and ADSI messages arrive at the ADSI Process as ADSI Frame (In) messages. These inbound messages are processed by the ADSI Process to update the Caller Log data or update the Phone Directory data. The ADSI Process will also produce ADSI Display messages for processing by the Interface Manager of FIG. 4-3. When the television is turned on the ADSI display information will be shown on the television screen.

The On Screen Display 90 is preferably formatted as a 24 column by 12 row character display that is displayed on the television set 20. This allows many differing sizes of televisions to be used from the oldest to the newest and from the smallest to the biggest. To allow for misalignment of television pictures, It is preferable that the outside edges of the character display not be used, therefore, it is preferable not to use columns 1 and 24 and rows 1 and 12. A typical idle state Display Table would be as follows:

TABLE 2

```
0 0 0 0 0 0 0 0 0 1 1 1 1 1 1 1 1 1 1 2 2 2 2 2
1 2 3 4 5 6 7 8 9 0 1 2 3 4 5 6 7 8 9 0 1 2 3 4
```

```
 1
 2                      NBTel
 3    Dial
 4    Callers Log
 5    Phone Directory              v
 6    TalkMail
 7    NBTel Express
 8    Call Features
 9    ScreenTalk
10
11    C < Callers Log
12
```

The lines that are shown on the screen are a subset of a physical page which is 33 lines long. The numbers appearing in row 1 being 01 thru 24 and the numbers appearing in the first column being 1 thru 12 do not appear on the page as displayed by the television. These numbers are there to simply identify the row and column being shown on the screen. The physical lines defined as row 3 through row 8 are the scrolling area such that if the information to be displayed is more than the 6 physical lines of the scrolling area, then the remaining excess lines will be off screen and can be viewed by the user by depressing the down arrow "v" cursor key. In the sample idle screen, the soft key "C" will display the label of the active line. In the example as shown "Callers Log" is the active line and the soft key "C" displays the label for "Callers Log". Accordingly, the text appearing next to the soft key "C" will change as the user uses the cursor keys to move the selected line up or down. The selected line is highlighted by using a different color than the other lines on the screen. The fact that the user can move the selection up from the selected line is denoted by the up arrow "^" cursor appearing on physical line 3 just above the selected line. The fact that the user can move the selection down from the selected line is demoted by the down arrow "v" cursor appearing on physical line 5 just below the selected line.

To turn off the sample ADSI display, the user would simply depress the "TV/Phone" button of the remote control 10. The Set Top 16 response to this input will be to clear all text overlays from the TV screen and return to the previous TV audio level and disable all soft keys and cursor control keys so that they have no effect on the regular TV operation. Similarly, the user can depress the "Clear" key or button of the remote control to have the exact same effect as the "TV/Phone" button.

With reference to the Caller Log data shown in the data flow diagram, the user is able to select this data for viewing on the TV 20 by depressing the "TV/Phone" button to bring up the idle channel display of the previous example Table 2. In this example, the "Caller Log" function was the selected function. By depressing Soft Key "C", the following screen of information would appear:

TABLE 3

```
  0 0 0 0 0 0 0 0 0 1 1 1 1 1 1 1 1 1 1 2 2 2 2 2
  1 2 3 4 5 6 7 8 9 0 1 2 3 4 5 6 7 8 9 0 1 2 3 4
 1
 2                Callers Log
 3   (506) 847 - 9265                      >
 4   (306) 933 - 3300                      v
 5   (506) 273 - 3763
 6   (416) 352 - 0945
 7   (207) 262 - 2790
 8   (908) 758 - 2396
 9   (306) 777 - 4875
10
11   C < Call              Remove > F
12
```

In this example Table 3, line 3 is the active line. The text is bold to indicate that this line is active and the left and down arrows are beside the active line to indicate that the user can scroll left or down but not up or right. If the user were to depress the soft key "C" the set top 16 would initiate a telephone call to the number shown on line 3 of the display. If the user were to depress the soft key "F", the contents of line 3 would be removed and the numbers below would be rolled up such that line 4 would become present on line 3 and so on for all subsequent lines. If the user were to depress the right arrow key, the following display would be shown:

TABLE 4

```
  0 0 0 0 0 0 0 0 0 1 1 1 1 1 1 1 1 1 1 2 2 2 2 2
  1 2 3 4 5 6 7 8 9 0 1 2 3 4 5 6 7 8 9 0 1 2 3 4
 1
 2                Callers Log
 3   06/18  07:56 am                       <
 4   06/18  09:43 am                       v
```

TABLE 4-continued

```
  0 0 0 0 0 0 0 0 0 1 1 1 1 1 1 1 1 1 1 2 2 2 2 2
  1 2 3 4 5 6 7 8 9 0 1 2 3 4 5 6 7 8 9 0 1 2 3 4
 5   06/18  10:04 am
 6   06/18   2:12 pm
 7   06/18   8:01 pm
 8   06/18  10:15 pm
 9   06/18  10:33 pm
10
11   C < Call              Remove > F
12
```

Referring now to FIG. 4-8 there is shown the LATA Manager of FIG. 4-1 in a more detailed data flow diagram. The LATA Manager provides the CLASS features of the Bellcore specifications (IBID[2, 3, 4, and 5] Other Bellcore features may be specified and incorporated into the LATA Manager from time to time. The discussions herein exemplify some of the features to indicate how they may be achieved in the present apparatus.). A LATA Frame message arrives at the LATA Manager from the Frame Manager as shown in FIG. 4-6. This frame is processed by the Decode Message process which decodes the message in accordance with the message formats provided by the Bellcore specification (IBID[1]). If the message is a Message Type 4 (MT=4), as defined in the Bellcore specification, the Decode Message process will forward the message to the Extract Words (SDMF) process (which stands for Single Data Message Format). The Extract Words (SDMF) process will forward the Date, Time and Dial Number for the incoming call to the Update Caller Log process where it will be stored in the Caller Log record for later viewing and review. If the TV is on, the Extract Words (SDMF) process will forward the Dial Number or Absent Dial Number Reason to the Display Caller ID process which in turn will prepare a LATA Display message for forwarding to the Interface Manager of FIG. 4-3.

Receipt of a Message Type of 128 (MT=128) message by the Decode Message process will cause the message to be forwarded to the Process Parameters (MDMF) (Multiple Data Message Format) process which in turn will examine the Parameter Type of the message to determine how to dispose of it. If the message Parameter Type is 4 (PT=4), the message will be given to the Absent DN Reason process which process the message to provide the reason for the missing dial number and the processed message is passed to the Display Caller ID process for display on the TV 20. For a Parameter type of 2 or 3 (PT=2/3) message, the message is delivered to the Caller's DN process which formats the message to provide the Display Caller ID process with the calling dial number for display on the TV 20 and also passes a message to the Update Caller Log process which in turn records the call in the Caller Log data. For a Parameter type of 7 (PT=7) message, the message is delivered to the Caller's Name process which in turn forwards the caller name data to the Display Caller ID process for display on the TV 20 and also to the Update Caller Log process which then records the caller's name in the Caller Log data. For a Parameter type 1 (PT=1) message, the Date/Time information is forwarded to the Update Caller Log process where it is recorded in the Caller Log data. It is not necessary to forward the Date/Time information to the Display Caller ID process as this information would already be available to the subscriber if he or she was watching TV.

While the invention has been described in terms of its preferred embodiment, it should be clearly understood that the invention is subject to numerous modifications which do not depart from it scope as defined by the appended claims.

The embodiments of the invention in which an exclusive property or privilege is claimed are defined as follows:

1. Apparatus for the provision of analog display services interface messages at a subscriber premises comprising:
   a hand held remote control device containing a plurality of buttons which produce control signaling unique to each button when depressed; and
   set top unit having:
      a telephone termination for connection to a telephone line of the public switched telephone network;
      a modem connected to the telephone termination, said modem being responsive to supervisory signaling carried on said telephone line, and including means connect to and disconnect from said telephone line, said modem including means for sending and receiving data over said telephone line and further including means to provide dial signaling on said telephone line;
      a TV outlet for connection to a television set;
      a tuner for providing radio frequency signaling to said TV outlet;
      a display memory storage area to hold character and graphical symbols connected to said tuner whereby data contained in the display memory area will be modulated onto the radio frequency signaling produced by said tuner to permit the display memory storage area contents to be viewed on said television set;
      receiver apparatus to receive the control signaling produced by said hand held remote control device;
      a microprocessor and associated memory for storage of a control program and data said microprocessor connected to said receiver apparatus to process the control signaling received from the hand held remote control device and connected to said display memory storage area whereby the data and symbols of the display memory area may be modified and updated by the microprocessor to affect the information display appearing on said television set and connected to said modem whereby data and supervisory signaling may be initiated by said microprocessor for delivery to the public switched telephone network and data and supervisory signaling may be received and acted on by said microprocessor;
      said modem apparatus further including an audio signaling output for carrying voice band audio signaling delivered to the subscriber over the public switched telephone network; and
      volume control means responsive to control signaling received from said microprocessor having an input port connected to said audio signaling output of said modem and a audio output port connected to said tuner whereby the audio signaling level of said output port is varied upward and downward by the microprocessor in response to commands received by the receiver apparatus in response to control signaling produced by said hand held remote control device to increase or decrease the sound level of the audio output from said television set.

2. Apparatus as claimed in claim 1, and further comprising:
   said tuner further including an audio output port for delivery of the audio portion of the specific program selected and an audio input port for modulation of the input audio signal received thereon onto the radio frequency signaling produced by said tuner thereafter being the audio heard from said television set; and
   an audio selection means responsive to commands received from said microprocessor having two audio signaling input ports, the first said port being connected to the audio signaling output of said modem and the second said port being connected to the audio signaling output port of said tuner, and an audio signaling output port whereby said audio signaling output port has present on it the audio signaling selected from either the modem or the TV tuner.

3. Apparatus for the provision of analog display services interface messages at a subscriber premises as claimed in claim 2, and further including:
   a hand held remote control device that produces wireless control signaling unique to each said button when depressed.

4. Apparatus for the provision of analog display services interface messages at a subscriber premises as claimed in claim 3, wherein said wireless control signaling is an infra red light beam.

5. Apparatus for the provision of analog display services interface messages at a subscriber premises comprising:
   a hand held remote control device containing a plurality of buttons which produce control signaling unique to each button when depressed; and
   a set top unit having:
      a telephone termination for connection to a telephone line of the public switched telephone network;
      a modem connected to the telephone termination, said modem being responsive to supervisory signaling carried on said telephone line, and including means connect to and disconnect from said telephone line, said modem including means for sending and receiving data over said telephone line and further including means to provide dial signaling on said telephone line;
      a TV outlet for connection to a television set;
      a tuner for providing radio frequency signaling to said TV outlet;
      a display memory storage area to hold character and graphical symbols connected to said tuner whereby data contained in the display memory area will be modulated onto the radio frequency signaling produced by said tuner to permit the display memory storage area contents to be viewed on said television set;
      receiver apparatus to receive the control signaling produced by said hand held remote control device;
      a microprocessor and associated memory for storage of a control program and data said microprocessor connected to said receiver apparatus to process the control signaling received from the hand held remote control device and connected to said display memory storage area whereby the data and symbols of the display memory area may be modified and updated by the microprocessor to affect the information display appearing on said television set and connected to said modem whereby data and supervisory signaling may be initiated by said microprocessor for delivery to the public switched telephone network and data and supervisory signaling may be received and acted on by said microprocessor;
      a TV inlet for connection to a cable TV system;
      said tuner being connected to said TV inlet whereby television programming delivered by the cable TV system is demodulated by said tuner, and stored in said display memory, in response to buttons depressed on said hand held remote control device by commands received from the microprocessor to which it is connected, said microprocessor producing said commands in response to the control signaling received by said receiver apparatus from the hand held remote control device;

said modem apparatus further including an audio signaling output for carrying voice band audio signaling delivered to the subscriber over the public switched telephone network; and volume control means responsive to control signaling received from said microprocessor having an input port connected to said audio signaling output of said modem and a audio output port connected to said tuner whereby the audio signaling level of said output port is varied upward and downward by the microprocessor in response to commands received by the receiver apparatus in response to control signaling produced by said hand held remote control device to increase or decrease the sound level of the audio output from said television set.

6. Apparatus as claimed in claim 5, and, further comprising:

said tuner further including an audio output port for delivery of the audio portion of the specific program selected and an audio input port for modulation of the input audio signal received thereon onto the radio frequency signaling produced by said tuner thereafter being the audio heard from said television set; and an audio selection means responsive to commands received from said microprocessor having two audio signaling input ports, the first said port being connected to the audio signaling output of said modem and the second said port being connected to the audio signaling output port of said tuner, and an audio signaling output port whereby said audio signaling output port has present on it the audio signaling selected from either the modem or the TV tuner.

7. Apparatus for the provision of analog display services interface messages at a subscriber premises as claimed in claim 6, and further including:

a hand held remote control device that produces wireless control signaling unique to each said button when depressed.

8. Apparatus for the provision of analog display services interface messages at a subscriber premises as claimed in claim 7, wherein said wireless control signaling is an infra red light beam.

* * * * *